United States Patent [19]

Wolf et al.

[11] Patent Number: 4,491,350
[45] Date of Patent: Jan. 1, 1985

[54] COUPLING

[75] Inventors: Franz J. Wolf; Hansjörg Lauer, both of Bad Soden-Salmünster, Fed. Rep. of Germany

[73] Assignee: WOCO Franz Josef Wolf & Co., Bad Soden-Salmuenster, Fed. Rep. of Germany

[21] Appl. No.: 356,690

[22] Filed: Mar. 10, 1982

[30] Foreign Application Priority Data

Mar. 27, 1981 [DE] Fed. Rep. of Germany ....... 3112258

[51] Int. Cl.³ .............................................. F16L 21/02
[52] U.S. Cl. ..................................... 285/236; 285/55; 285/369
[58] Field of Search ................... 285/235, 236, 369, 55

[56] References Cited

U.S. PATENT DOCUMENTS

| 3,334,928 | 8/1967 | Schmunk | 285/236 X |
| 3,430,989 | 3/1969 | Wendt | 285/235 X |
| 3,682,503 | 8/1972 | Bloom | 285/369 X |
| 4,380,348 | 4/1983 | Swartz | 285/236 |

FOREIGN PATENT DOCUMENTS

| 925743 | 3/1955 | Fed. Rep. of Germany | 285/236 |
| 1211045 | 2/1966 | Fed. Rep. of Germany | . |
| 7037139 | 1/1971 | Fed. Rep. of Germany | . |
| 1281759 | 11/1971 | Fed. Rep. of Germany | . |
| 2109566 | 12/1972 | Fed. Rep. of Germany | . |

Primary Examiner—Dave W. Arola
Attorney, Agent, or Firm—Jordan and Hamburg

[57] ABSTRACT

A coupling for connecting pipe ends includes a sleeve member having radial flanges at the longitudinal ends thereof, a plurality of spaced ribs, tightening straps disposed about the sleeve between the spaced ribs, and a resilient collar extending into the sleeve for receiving the pipe ends, the resilient collar also extending around the longitudinal ends of the sleeve member and around the radial flanges, the resilient collar further having a ring-like section extending on the longitudinally inner sides of the radial flanges such that the ring-like section grips onto the longitudinal inner sides of the radial flanges.

8 Claims, 3 Drawing Figures

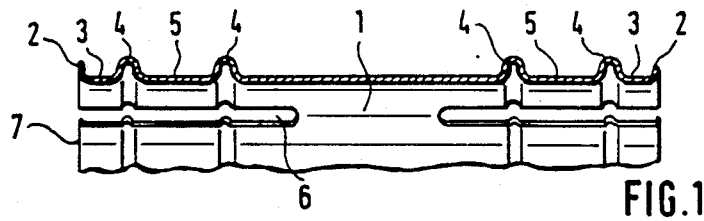
U.S. Patent    Dec. 4, 1984    4,491,350
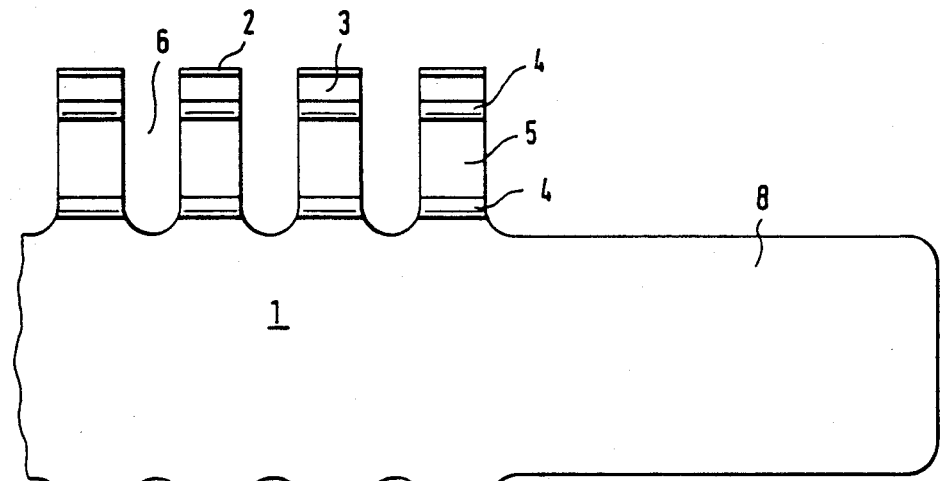
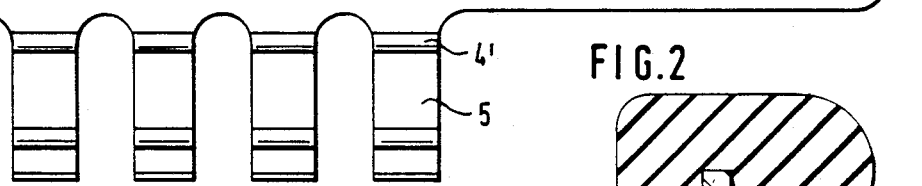
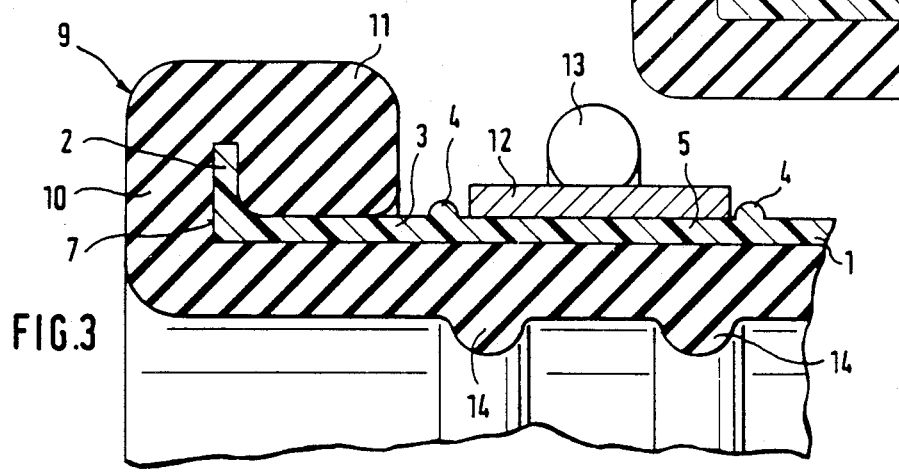

COUPLING

BACKGROUND OF THE INVENTION

The invention relates to a coupling of the type which is used particularly but not exclusively for the repair of pipe conduits. Generally, such couplings may be used anywhere where two couplingless pipe ends, so-called point ends, that are at least substantially coaxially arranged relative to each other, have to be joined at a front joint.

A coupling of the aforementioned type is known from Federal Republic of Germany DE No. 12 81 759 C3. This known coupling consists of a rubber collar for accepting both pipe ends which have to be connected, an axially slitted plastic sleeve that encircles the collar from outside, and tightening straps which are interposed between radial guide ribs so that they are secured against axial displacement. The coupling has altogether two tightening bands which are disposed immediately at the rim of the sleeve. The guide rib for the tightening band which is axially external is formed as a radial bar, protruding flange-like radially outwardly immediately at the outer rim of the sleeve. In compound couplings, the rubber collar is protected against axial displacement by an axial centrally disposed ringslot annular spring catch. This type of axially fixing of the rubber collar is insufficient. When the tightening bands are not tightened and the sleeve is not pre-tightened, a problem arises in that the collar lying relatively loosely in the sleeve falls out of it and is lost. Handling of the coupling as one unit is thereby adversely affected. At least just as great is the problem of axial displacement of the sleeve and of the collar against each other while the pipe connection is made. An exact fixing between the collar relative to the coupling though is an inadmissible condition for reliable tightness of the coupling.

In the coupling disclosed in Federal Republic of Germany DE No. 12 11 045 B1, the axial fixation of the rubber collar in the sleeve is obtained by furnishing the axially slitted coupling rim with bar segments which are bent up alternating radially inwardly and radially outwardly. The radially downwardly bent bar segments serve to axially fix the rubber collar by gripping frontally the frontal planes of the collar in the manner of a check ring. The radially outwardly bent-up bar segments serve as a guide or check for the tightening straps and prevent them from springing off axially outwardly from the substantially barrel-shaped sleeve.

The radially inwardly bent bar segments of the aforedescribed known coupling are not capable of preventing the collar from jumping over the inner rim of the bent bar segments already at the least radially inwardly directed deformation and thereby looses its fixation. Thus the coupling is open to undesired and uncontrolled removal from the sleeve. Furthermore, in this embodiment of axial fixing of the collar in the sleeve, it is also not assured that, when the pipe connection is prepared, the inwardly bent bar segments of the sleeve reach, as desired, equally over the frontal sides of the collar so that the predetermined axial position of the collar relative to the sleeve is obtained.

An obviously better axial fixing of sleeve and collar relative to each other is obtained in the coupling known from Federal Republic of Germany DE Nos. 70 37 139 U1 and 21 09 566 C3. Outer rim areas of the rubber collar encircle both oppositely disposed outer rims of the sleeve and are forced onto the outer rims of the sleeve by the tightening bands. The advantage of this arrangement is that the tightening bands "float," in other words their resilience, needed for the tightness of the coupling, is not directly transferred to the rigid sleeve and from it to the sealing area of the rubber collar, but influences, already dampened and buffered, the outer mantle of the sleeve. Pipe connections prepared by this coupling therefore are not as safe. Furthermore, considerably stronger tightening bands, particularly more expensive tightening elements for the tightening bands, have to be used in order to apply satisfactory radial forces. Finally, the coupling known from the aforementioned documents requires in both cases a relatively large use of expensive elastomer.

In view of the aforementioned state of the prior art, an object of the present invention is to provide a coupling of the aforementioned type wherein the collar and the sleeve are connected to form a particularly axially sufficing stabilized unit without using an excessive amount of an elastomer and wherein the tightening straps abut directly the outer plane of the sleeve.

Accordingly, the invention provides a coupling having a collar, sleeve and tightening bands wherein a radially outwardly protruding radial bar at the rim of the sleeve does not serve to guide the tightening bands but serves to axially fix and improve the overall rigidity of the coupling by the radial bar being encircled by the outer edges of the collar, and particularly in such a way that the radial bar is axial tight gripped from behind by a ring-like reinforced segment of the collar. It is significant that the ring segment of the collar may be pulled axially outwardly over the radial bar of the sleeve only by using a significantly radially outwardly directed extending force. In each case, the desired and needed return force of the ring segment may be obtained as usual by a corresponding dimensioning of the ring-shaped reinforcement. This ring segment of the collar therefore preferably has at least a circular or square cross section or a catenary cross section. The inner ring diameter of this ring segment is preferably of such a size that it encircles the sleeve with radial pre-tension.

The coupling of the invention thus forms without tightening bands a solid unit, wherein particularly the collar and the sleeve are solidly axially fixed relative to each other. The coupling may be transported, handled and be useable for the preparation of pipe connection without any danger of changing the required axial position of the sleeve. Furthermore, the connection between collar and sleeve may be prepared at particularly economical costs, in other words, it may be pre-assembled. In order to prepare this connection, neither must the tightening bands be already attached or even be introduced in closed guides, nor must the sleeve rim be deformed when the coupling is pre-assembled.

The collar of the coupling consists preferably of usual rubber grades but may also be prepared easily out of corresponding plastic materials as long as the use specifications allow that.

The tightening bands consist particularly of steel or of high-strength plastics or corresponding composite materials. The tightening means used for tightening the tightening bands are of the usual kind and known in many styles, so their detailed explanation is not set forth herein.

The sleeve consists preferably of a material which lends on one hand sufficient rigidity to the sleeve and which, on the other hand, keeps its plasticity needed for bridging tolerances and lack of roundness of the pipe ends to be joined. Due to this criteria, the sleeve consists preferably of corrosion-proof steel or a plastic, preferably a reinforced plastic.

The sleeve has ring-shaped guide ribs, projecting radially outwardly, which are integrally fabricated with the sleeve or are made by modifying it. The tightening bands are laid between these guide ribs. Each guide rib that might be the axially outermost one lies as much axially inwardly from the outer edge of the sleeve that the distance between the inner edge of the radial bar at the sleeve edge and the axially outer edge of this guide rib is at least as large as the axial breadth of the ring-shaped segment of the collar.

The sleeve has preferably axial grooves extending axially inwardly from the outer edge of the sleeve, in face even below the tightening bands, preferably in an axial depth, that extends farther than over the tightening bands axially inwardly. These grooves serve to accomodate even large and very large deviations of the real outer cross sections of the pipe ends to be joined from the nominal cross sections and also out-of-round pipe ends without diminishing the imperviousness of the pipe connection.

Another adaptability to deviations of the measurements of the pipe ends to be joined from predetermined target measurements while simultaneously further stabilizing the coupling, and a noticeable easing of work before mounting itself, is obtained when the sleeve, according to one embodiment of the invention, is not cylindrically closed but is formed as an open band whose ends overlap in the area of a tongue, forming an integral part of it, the axial breadth of the tongue having such a size that it passes between two tightening bands disposed in the edge areas without getting anywhere under the tightening band. The integrally formed tongue, overlapped by the open sleeve band, is in axial direction also narrower than the inner edge distance between both ring-shaped guide ribs for the tightening bands, the guide ribs opposing each other in the outer end area of the sleeve.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalences of the claims.

The construction and operation of the invention, however, together with additional objects and advantages thereof will be best understood from the following description of specific embodiments when read in connection with the accompanying drawings.

BRIEF DESCRIPTION OF THE DRAWINGS

FIG. 1 is a partial schematic and axial sectional view of a sleeve of a coupling according to one embodiment of the invention.

FIG. 2 is a partial top view of the end of a sleeve of a coupling formed as an open band and provided with a tongue.

FIG. 3 is a partial axial view of a ready-for-use and pre-mounted coupling.

DESCRIPTION OF THE PREFERRED EMBODIMENTS

FIG. 4 is a partial axial view similar to FIG. 3 but showing an alternate embodiment.

Referring to the drawings, in the embodiment of FIG. 1, there is shown a coupling comprising a sleeve of corrosion-resistant steel and which is substantially of cylindrical form. Outer rims of the sleeve are flange-like and beaded radially outwardly forming radial bars 2 for the anchoring of a collar. A smooth cylindrical segment 3 of the sleeve 1 connects axially inwardly to radial bar 2, the segment 3 serving to accept a ring-like reinforcement collar pulled around the radial bar 2.

Upon the side opposite axially to radial bar 2, the cylindrical sleeve segment 3 is limited by two ring-shaped guide ribs 4 which are formed as radially outwardly protruding beads. Between the two ring-shaped guide ribs 4,4 is again formed a smooth cylindrical sleeve segment 5 whose axial breadth is at least substantially corresponding to the breadth of a tightening strap to be interposed between both guide ribs 4,4.

Sleeve 1 furthermore has a series of axial slits 6 distributed around its whole circumference at equal angular distances, such slits extending axially inwardly from the outer edge 7 of sleeve 1 to behind the second ring-shaped guide rib 4. These axial slits 6 make it possible that the tightening straps, laid around sleeve 1 in the cylindrical segments 5, are capable of diminishing the diameter of sleeve 1. This serves to produce a radially inwardly directed abutting pressure on the inside lying rubber collar for the purpose of packing.

In contradistinction to the embodiment of the sleeve shown in FIG. 1, FIG. 2 shows a top view of the end of a sleeve consisting of an open band. In FIG. 2, sleeve 1 is made of corrosion-resistant steel. The slits 6 of the embodiment of the sleeve shown in FIG. 2 are considerably broader than in the embodiment shown in FIG. 1 and have the same breadth as the finger-shaped sleeve segments left standing, which are formed substantially by the radial bar 2, the first cylindrical segment 3, both guide ribs 4 and the cylindrical segment 5 formed between these two guide ribs.

In FIG. 2, at the right end of the band forming sleeve 1, there is formed a tongue 8 which extends axially relative to the band forming the sleeve and extends relative to the cylindrical sleeve in the direction of the circumference so far that it overlaps sufficiently wide the opposite end of the band even at the largest allowed circumference of the sleeve, such overlapping occurring preferably particularly radially inside, seen from the outside thus underneath the opposite end of it. The breadth of tongue 8 is such that it is smaller than the distance of both axially innermost guide ribs 4,4 from each other. This assures that the tongue is not diminished as to its displaceability and moveability in the direction of the circumference by the tensed tightening bands which lie in the cylindrical segments 5. Such a moveability increases the safety of mounting and eases the mounting process.

An embodiment of the complete coupling of the invention is partially shown in axial section in FIG. 3. Sleeve 1 is made of plastic and has on its outer edge a radial bar 2 in the form of a flange-like configuration. Collar 9 encircles with its outer edge 10 the outer edge 7 and the radial bar 2 of sleeve 1. An integrally formed ring-shaped reinforcement 11 of the outer edge 10 of collar 9 grips from behind the radial bar 2 axially from inside. The radial bar 2 is stretched between the outer rim 10 and the ring segment 11 of collar 9. The ring segment 11 also has a radial prestress towards the cylindrical mantle section 3 of sleeve 1. The ring segment 11 of collar 9 has a substantially square cross section with ample rounded edges. The ring segment 11 has such dimensions that considerable force is required to radially widen out the ring segment 11. The ring segment may have a substantially circular cross-sectional configuration as indicated at 15 in FIG. 4.

Between two radially outwardly projecting and integrally formed ring-shaped guide ribs 4, there is disposed a tightening strap 12 secured against axial displacement and which may be tensed by the schematically suggested tensing means 13 for a diminution of the radius. This radially inwardly directed force, produced by this diminution of the radius, is directly transferred onto the cylindrical segment 5 of sleeve 1 and from the sleeve 1 onto collar 9 and packing elements 14 formed on collar 9, such packing elements packing the inner mantle of the collar against the outer mantle of an introduced pipe end. The packing elements 14 are shown in FIG. 3 as simple bulging rings. In practice, they may have any other shape, for example a lip shape.

What we claim is:

1. A coupling for connecting pipe ends comprising a sleeve member having longitudinal ends and a longitudinal axis, said sleeve member having a plurality of longitudinally extending slits extending from the longitudinal ends of said sleeve member, said sleeve member having a generally longitudinal central section disposed between the longitudinally innermost ends of said slits, said sleeve member being initially formed as an open band having an integrally formed tongue which overlaps along an overlapping section with said central section of the sleeve member when the open band is formed into a generally cylindrical configuration to form said sleeve member, a plurality of spaced ribs formed on said sleeve member, two tightening straps disposed about said sleeve member between said spaced ribs, said overlapping section being longitudinally narrower than the longitudinal distance between said two tightening straps disposed about said sleeve member, radial flanges at the longitudinal ends of said sleeve member, said radial flanges extending perpendicular to the longitudinal axis of said sleeve member, a resilient collar on said sleeve member extending into said sleeve member for receiving the pipe ends, said resilient collar having a first portion extending around the longitudinal ends of said sleeve member and a second portion extending radially outwardly of said radial flange, said resilient collar also having a ring-like section extending on the longitudinally inner sides of said radial flanges, the longitudinal distance between the longitudinal end of said sleeve and the closest of said ribs being at least as large as the axial length of said ring-like section of said collar, said ring-like section being larger than said first portion of said resilient collar, whereby said ring-like section grips onto the longitudinal inner sides of said radial flanges.

2. A coupling according to claim 1 wherein said ring-like section has a substantially square-shaped cross sectional configuration.

3. A coupling according to claim 1 wherein said ring-like section has a substantially circular cross sectional configuration.

4. A coupling according to claim 1, wherein said sleeve member has a plurality of longitudinally extending finger-like portions having common longitudinal edges with said longitudinally extending slits, said finger-like portions having a transverse width substantially equal to the transverse width of said slits.

5. A coupling according to claim 4, wherein said ribs are disposed on said finger-like portions, the longitudinal distance between the two axial innermost ribs being greater than the longitudinal width of said tongue.

6. A coupling according to claim 5, wherein said tongue and said central section are of substantially the same longitudinal length.

7. A coupling according to claim 1, wherein said sleeve member has longitudinal end sections justaposed to said central section, all of said ribs being disposed on said longitudinal end sections.

8. A coupling according to claim 1, wherein the longitudinal distance between said ribs in substantially equal to the width of said tightening straps.

* * * * *